Sept. 23, 1924.
C. L. COOK
POWER TRANSMISSION
Filed Jan. 24, 1921
1,509,713
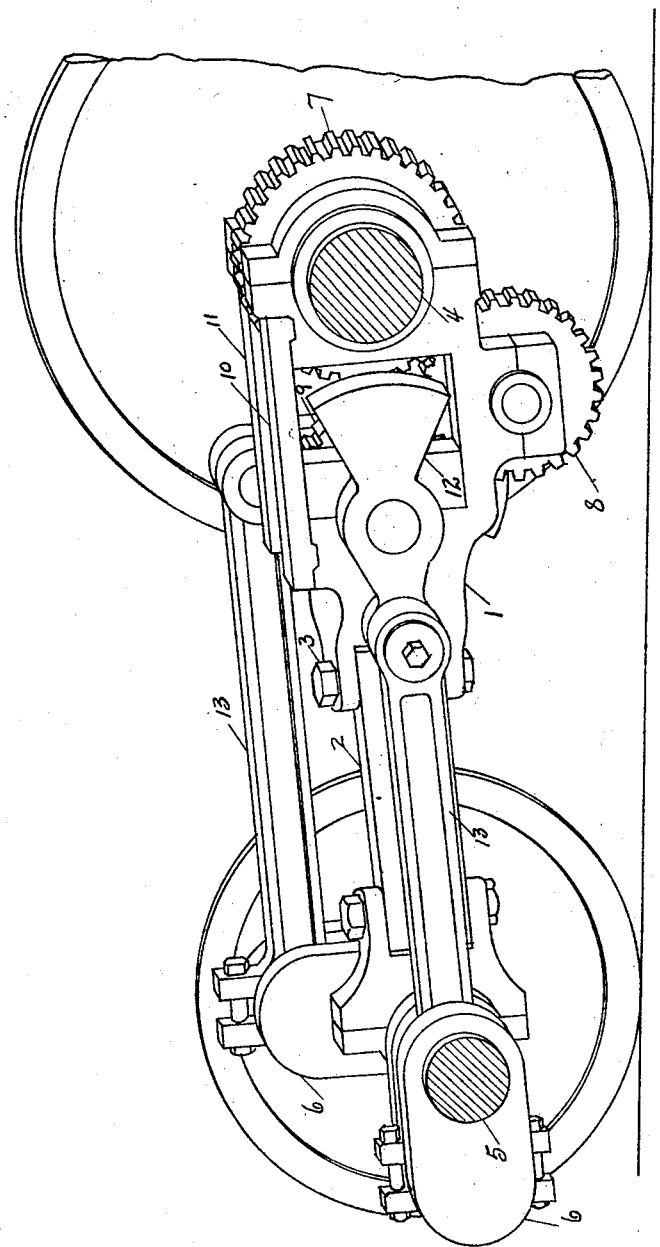
Charles Lee Cook
INVENTOR.
BY
Bradford Webster
ATTORNEY.

Patented Sept. 23, 1924.

1,509,713

UNITED STATES PATENT OFFICE.

CHARLES LEE COOK, OF LOUISVILLE, KENTUCKY.

POWER TRANSMISSION.

Application filed January 24, 1921. Serial No. 439,609.

*To all whom it may concern:*

Be it known that I, CHARLES LEE COOK, a citizen of the United States, residing at Louisville, Jefferson County, Kentucky, have invented certain Improvements in Power Transmission, of which the following is a specification.

My invention relates particularly to power transmission used in steam locomotives, and more especially to that used in connecting traction wheels of different sizes. It has for its object to provide a means of combining all wheels under a locomotive into a chain of drivers so as to increase traction without materially increasing weight and without loading any drivers beyond the limit of safety. As it is not practicable in connection with reciprocating engines to attach reciprocating parts of the cylinders to drivers of small diameter, owing to unsafe speed of reciprocation, and as it is furthermore impossible to have all wheels under a standard locomotive of large enough diameter for practicable attachment to reciprocating parts, my invention provides a reduction gear and connecting rod for combining all wheels under a standard locomotive as drivers, whereby wheels of different diameters may be geared together in such ratio as will maintain a common rim velocity. In general locomotive practice there is provided sufficient play between the axles and the journals thereof, between the driving boxes and the frame jaws, and also in the journals of the connecting rods, to permit the almost constant variation of centers of the various parts resulting from inequalities in the road bed and other causes. This has been assumed in the present case, and the necessary lost motion is not specifically indicated upon the drawing.

In the drawing the figure is a perspective view of an embodiment of my invention associated with the rear driving wheel of a steam locomotive.

The main body 1 of the frame rides on the axle 4 of the rear driving wheel of the locomotive and is pivoted vertically by the bolt 3 to the extension 2, which rides on the axle 5 of the trailer wheels of the locomotive. This pivoted connection takes care of lateral thrust in traction.

On the axle 4 is positioned the first gear 7, driving the intermediate gear 8, positioned in the lower part of the frame 1, in the two sides 10 and 11 of the body 1. The gear 8 drives the last gear 9 of the train, which is positioned in the same manner as the gear 8, nearer the forking juncture of the main frame 1. On the axle of the gear 9 is fixed the pair of cranks 12, preferably at opposite ends of said axle. The cranks 12 are connected with cranks 6 on the axle of the small wheel 5 by connecting rods 13.

These pairs of cranks are respectively perpendicular to each other in order to obtain a smooth motion without any jars or jerks, and to avoid any dead centering of parts. The gears 7, 8 and 9 will be so chosen as to give the smaller wheels the same rim velocity as the larger wheels, and the parts will be timed so as to have the movements of the cranks 12 coincide as rarely as possible with the movement of the main drive of the locomotive.

While I have illustrated the preferred form of my invention it is obvious that detailed changes may be made without departing from the scope of the invention as set forth in the appended claims.

I claim:

1. A power transmission, comprising a crank and gear reduction mechanism and a vertically disposed forked frame for same; said frame being adapted to ride on a pair of axles, one at either end, and being in two parts, adapted to swing laterally.

2. A power transmission comprising a driving wheel and its axle, a driven wheel and its axle, a gear mounted on the axle of the driving wheel, cranks on the axle of the driven wheel, and gear and crank connections between said driving wheel gear and driven wheel cranks to turn the driven wheel with the same rim velocity as the driving wheel.

3. A power transmission comprising a driving wheel and its axle, a driven wheel of smaller size and its axle, a gear mounted on the axle of the driving wheel, cranks on the axle of the driven wheel, gear and crank connections between said driving wheel gear and driven wheel cranks to turn the driven wheel with the same rim velocity as the driving wheel, and a laterally flexible frame supporting said connections.

4. A power transmission mechanism comprising a driving wheel and its axle, a driven wheel of different size and its axle, a frame supported by said axles and flexible laterally, and transmission connections on said frame and connecting the two axles to cause the two wheels to turn at the same rim velocity.

CHARLES LEE COOK.

Witnesses:
  STELLA A. CRONEN,
  WM. C. CROSS.